(12) United States Patent
Emery

(10) Patent No.: US 7,263,035 B2
(45) Date of Patent: Aug. 28, 2007

(54) EARLY AUTO-ON MOBILE COMMUNICATIONS DEVICE

(75) Inventor: Jeff Emery, Ottawa (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/395,337

(22) Filed: Apr. 3, 2006

(65) Prior Publication Data

US 2007/0060119 A1    Mar. 15, 2007

Related U.S. Application Data

(63) Continuation of application No. 11/222,828, filed on Sep. 12, 2005, now Pat. No. 7,054,232.

(51) Int. Cl.
*G04B 47/00* (2006.01)
*G06F 1/04* (2006.01)

(52) U.S. Cl. .......................... 368/10; 368/74; 368/251; 702/177; 702/178; 713/502

(58) Field of Classification Search .................... 368/9, 368/10, 73–74, 250, 251; 702/176–178; 713/500, 502

See application file for complete search history.

(56) References Cited

U.S. PATENT DOCUMENTS

| | | | |
|---|---|---|---|
| 4,255,803 A | | 3/1981 | Sekine |
| 4,544,283 A | * | 10/1985 | Nakanishi .................... 368/251 |
| 5,317,547 A | * | 5/1994 | Oishi .......................... 368/10 |
| 5,557,784 A | | 9/1996 | Dayan et al. |
| 2002/0174371 A1 | | 11/2002 | Padawer et al. |
| 2003/0001727 A1 | | 1/2003 | Steinmark |
| 2003/0153368 A1 | | 8/2003 | Bussan et al. |
| 2004/0250154 A1 | | 12/2004 | Lin et al. |

FOREIGN PATENT DOCUMENTS

| | | |
|---|---|---|
| WO | WO 9734218 | 9/1997 |
| WO | WO 0038338 | 6/2000 |

OTHER PUBLICATIONS

European Search Report for corresponding European Patent Application No. EP 05108338.4.

* cited by examiner

*Primary Examiner*—Vit W. Miska
(74) *Attorney, Agent, or Firm*—Ridout & Maybee LLP

(57) ABSTRACT

Apparatuses and methods for starting a mobile communications device are disclosed. The mobile communications device is operated by a device user. The device includes an output device for emitting a sensible signal. An input device receives user input from the device user. An alarm application receives an input time and date through the input device and determines an adjusted time and date. The adjusted time and date comprises the input time and date minus a predicted boot time for the device. The alarm application also causes the output device to emit the sensible signal at the input time and date. A system timer component monitors a current time and date when the device is in a low-power or off state and initiates a boot process when the current time and date match the adjusted time and date. The boot process is completed prior to the input time and date to enable the alarm application to cause emission of the sensible signal at the input time and date.

19 Claims, 3 Drawing Sheets

EARLY AUTO-ON MOBILE COMMUNICATIONS DEVICE

CROSS-REFERENCE TO RELATED APPLICATIONS

The present application is a continuation of U.S. patent application Ser. No. 11/222,828, filed Sep. 12, 2005 now U.S. Pat. No. 7,054,232, and owned in common herewith.

FIELD

The present application relates to mobile communications devices and, in particular, to methods and apparatuses for starting or powering-up mobile communications devices.

BACKGROUND

For many years the alarm clock radio has been the most commonly used device for waking people from sleep; however alarm clock radios are not the only devices capable of emitting a relatively loud alarm at a preset time. Mobile communication devices such as, for example, cellular phones and Personal Digital Assistants (PDAs) can also be employed.

Most mobile communication devices have a limited power source, like a battery. In order to conserve the available power, users typically turn off the devices when not in active use. Alternatively, the device may enter a low-power or "sleep" mode after a predefined period of inactivity.

In order to emit an alarm signal at a preset time, the devices typically need to transition to an active or power-on state. Many devices are capable of recognizing the occurrence of the preset alarm time even while in a power-down or sleep mode and they transition to a power-on or active mode at the preset time in order to issued the alarm signal. However many such devices have a boot period during which computer instructions need to be loaded into the device's RAM from the device's non-volatile memory. More complex devices, like PDAS, may include features, like a Java Virtual Machine, that may take several minutes to load and become active. The computer instructions to generate the alarm signal cannot be executed during at least a substantial portion of the boot period, and consequently an alarm may not occur until several minutes after the preset alarm time.

Accordingly, it would be advantageous to improve apparatus and methods for starting up a mobile communications device.

BRIEF DESCRIPTION OF THE DRAWINGS

Reference will now be made, by way of example, to the accompanying drawings which show example embodiments of the present invention, and in which.

Similar reference numerals may have been used in different figures to denote similar components.

DESCRIPTION OF EXAMPLE EMBODIMENTS

The following description of example embodiments of the invention does not limit implementation to any particular mobile communications device architecture. Also, it will be understood that "mobile communications device" as used herein is not limited to those devices that are wirelessly enabled.

According to one aspect, the present application discloses a mobile communications device that is operated by a device user. The device includes an alarm indicator for notifying the user of an alarm condition, an alarm application for receiving an input alarm time and subtracting a predicted boot time from the input alarm time to generate an adjusted alarm time, and a system timer component for monitoring a current time and outputting an interrupt signal to trigger a boot process when the current time matches the adjusted alarm time. The alarm application includes a component for triggering operation of the alarm indicator when the input alarm time occurs.

According to another aspect, the present application describes a method of using a mobile communications device to emit an alarm signal to a device user. The method includes steps of receiving an input alarm time, subtracting a predicted boot time from the input alarm time to generate an adjusted alarm time, and storing the adjusted alarm time. The method also includes steps of, while the device is in a low-power or off state, monitoring a current time and outputting an interrupt signal to trigger a boot process when the current time matches the adjusted alarm time. The method then includes the step of emitting the alarm signal at the input alarm time, whereby the boot process is completed prior to the input alarm time.

According to yet another aspect, the present application provides a mobile communications device that is operated by a device user. The device includes means for receiving an input alarm time and subtracting a predicted boot time from the input alarm time to generate an adjusted alarm time, means for monitoring a current time and outputting an interrupt signal to trigger a boot process when the current time matches the adjusted alarm time, and means for emitting an alarm to notify the user of an alarm condition when the input alarm time occurs following completion of the boot process.

Figure 1:
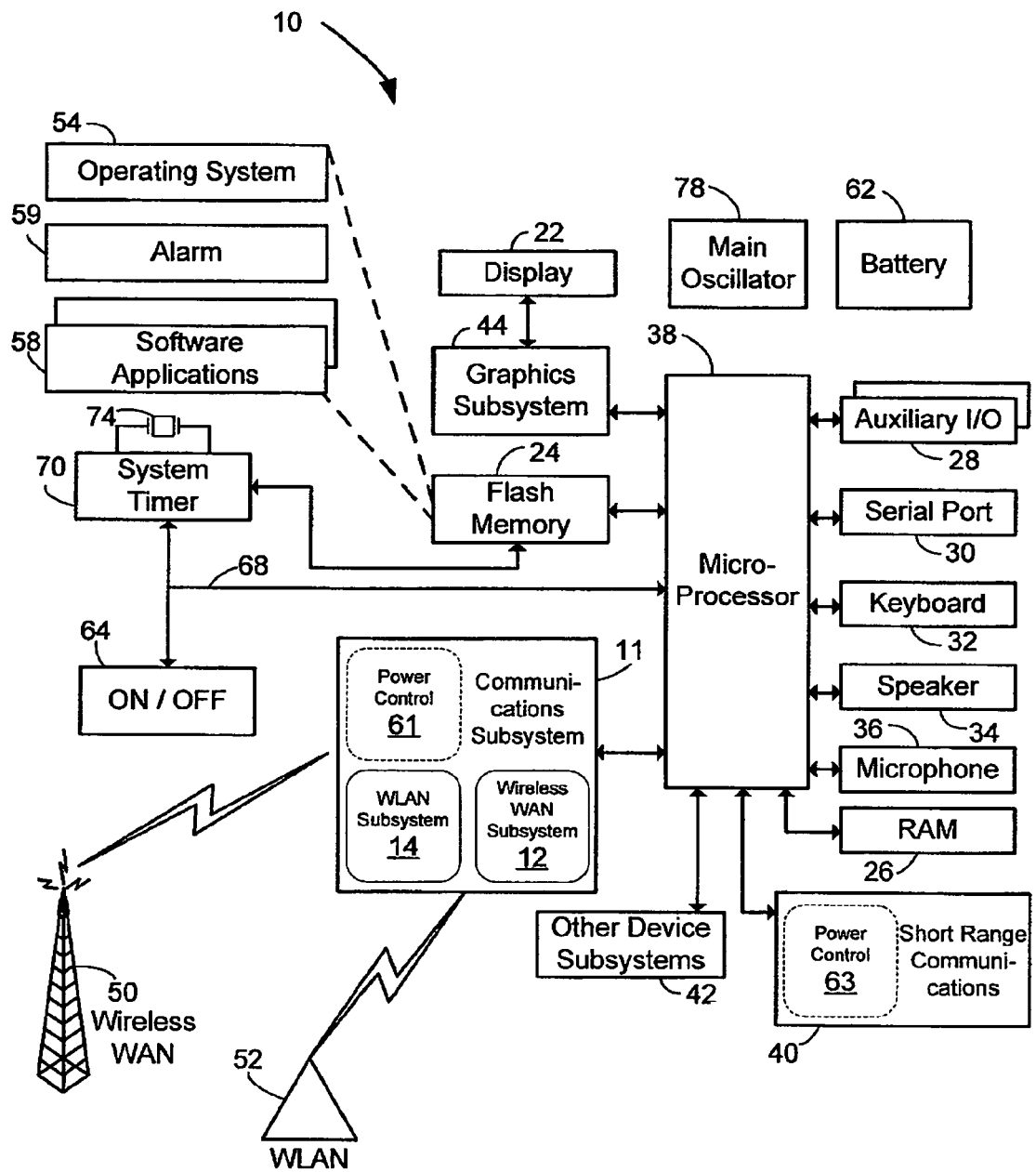
FIG. 1 shows a block diagram of a mobile communications device to which embodiments of the present invention can be applied.

Referring now to the drawings, FIG. 1 shows a block diagram of a mobile communications device 10 to which example embodiments of the invention can be applied. In at least one example, the mobile communications device 10 is a two-way mobile communication device having data and possibly also voice communication capabilities. In an example embodiment, the device 10 has the capability to communicate with other devices and computer systems on the Internet. Depending on the functionality provided by the device 10, in various embodiments the device may be a data communications device, a multiple-mode communications device configured for both data and voice communication, a mobile telephone, or a Personal Digital Assistant (PDA), among other things.

In the illustrated embodiment, the device 10 includes a wireless communications subsystem 11 for exchanging messages with one or more communications networks 50, 52. In one example embodiment, the subsystem 11 includes a wireless wide area network (WAN) communications subsystem 12 for communicating with a cellular (wireless) WAN 50 and a wireless local area network (WLAN) communications subsystem 14 for communicating with WLAN 52. In some examples, the communications subsystems 12, 14 may each include a receiver, a transmitter, and associated components such as one or more, preferably embedded or internal, antenna elements, and a processing module such as a digital signal processor (DSP). As will be apparent to those skilled in the field of communications, the particular design of the communications subsystem 11 will be dependent in part upon the communication network(s) in which the device 10 is intended to operate. For example, if the device is not intended to communicate over a WLAN, then the device might not include the WLAN subsystem 14. As another example, if the device is not intended to communicate over a cellular WAN, then the device might not include the wireless WAN subsystem 12.

The device 10 includes a microprocessor 38 that controls the overall operation of the device. The microprocessor 38 interacts with the communications subsystem 11 and also interacts with further device subsystems/circuitry such as on/off circuitry 64, a system timer component 70, a graphics subsystem 44, flash memory 24, random access memory (RAM) 26, auxiliary input/output (I/O) subsystems (and/or devices) 28, serial port 30, keyboard or keypad 32, speaker 34, microphone 36, a short-range communications subsystem 40, and any other device subsystems generally designated as 42. The graphics subsystem 44 interacts with a display 22 and renders graphics and/or text upon the display 22.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, can enable execution of software applications 58 on the device. A predetermined set of software applications 58 which control basic device operations, including data and voice communication applications for example, will normally be installed on the device 10 during manufacture. Further software applications 58 may also be loaded onto the device 10 through the wireless networks 50, 52, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communications subsystem 11 and input to the microprocessor 38, which will preferably further process the received signal for output to the display 22 through the graphics subsystem 44, or alternatively to an auxiliary I/O device. A user of device 10 may also compose data items within a software application 58, such as e-mail messages for example, using a user input device such as the keyboard 32 in conjunction with the display 22 and possibly an auxiliary I/O device 28 such as, for example, a thumbwheel. Such composed items may then be transmitted over the communications network 50 or 52 through the communications subsystem 11.

The serial port 30, which may be a universal serial bus (USB) port, would normally be implemented in a personal digital assistant (PDA)-type communications device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communications network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless mobile network 50 is, in an example embodiment, a wireless packet data network, (e.g. Mobitex™ or DataTAC™), which provides radio coverage to mobile communication devices 10. Wireless mobile network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some examples, the WLAN 52 includes a number of wireless access points, and operates in conformance with one or more IEEE 802.11 protocols. In some examples, WLAN 52 is part of a corporate (or other organization) network.

When the user of the mobile communications device 10 is "on the go", the device 10 will normally be powered by at least one battery 62. In some example embodiments, the battery 62 is a Li~ion rechargeable battery. Nickel metal hydride and nickel-cadmium are other well known types of rechargeable batteries.

To conserve the energy stored in the battery 62, the user may turn the device 10 off if the user is not actively using it. It will be understood that when the device 10 is turned on, power will normally be delivered to the microprocessor 38 and the various subsystems but when the device 10 is turned off, power will normally be delivered to only certain components which require a relatively minimal amount of power as subsequently explained. Hence, normally a much lower magnitude of power is consumed when the device 10 is off as opposed to when it is on. In some example embodiments the device 10 may have additional power states besides power off and power on. For example, there may be a sleep mode power state where the RAM memory 26 is periodically refreshed so that code and data in memory cells of the RAM memory 26 are maintained. In such a power state, the power consumed is less than when the device 10 is fully turned on, but greater than when the device 10 is turned off.

In some examples of the device 10, power may be managed at the subsystem level. For instance, the communications subsystem 11 and the short-range communications subsystem 40 may optionally include a power control unit 61 and a power control unit 63 respectively. For the illustrated communications subsystem 11, the power control unit 61 controls how and when power to the wireless WAN subsystem 12 and the WLAN subsystem 14 is provided. The power control unit 63 controls how and when power to the short-range communications subsystem 40 is provided. One skilled in the art will appreciate that in some instances the microprocessor 38 will dictate the behavior of the power control units 61 and 63. Also, it will be understood that the power control units 61 and 63 may be implemented in hardware or in software. In such an embodiment, the subsystem may include a controller which executes the software for implementing the power control function.

The device 10 includes an on/off selector. In some embodiments the on/off selector may be implemented as a dedicated button or switch. In other embodiments, the on/off selector may include a button or combination of buttons on the keyboard or keypad 32. Pressing the on/off button actuates on/off circuitry 64. The on/off circuitry 64 may be implemented in a variety of ways, the details of which will be appreciated by those of ordinary skill in the art. In the present embodiment, the on/off circuitry 64 delivers an interrupt on interrupt line 68 to either power down the device 10 when it is on, or power up the device 10 when it is off.

As mentioned, the illustrated device 10 includes a system timer component 70 that in some example embodiments is a dedicated integrated circuit that may be referred to as a "real-time clock". Like the on/off circuitry 64, the system timer component 70 may also deliver an interrupt on interrupt line 68 to power up the device 10 when it is off. Those skilled in the art will appreciate that one of the functions of the system timer component 70 is to keep track of date and time when the device 10 has been turned off. In some example embodiments, time and date values generated by the system timer component 70 may be stored in the flash memory 24, because this memory has memory cells that do not require periodic refreshing. In some other example embodiments, the system timer component 70 may be contained in a microchip that includes a small memory for storing current time and date values.

An oscillator 74 is provided for generating a clock signal for the system timer component 70. In some example embodiments, the oscillator 74 comprises a crystal, such as, for example, a watch crystal. The oscillator 74 generates a relatively low frequency clock signal (in the tens of kHz rather than MHz order of magnitude). As will be appreciated by those skilled in the art, because the system timer component 70 receives a relatively low frequency clock signal, it consumes a relatively low amount of power when the device 10 is in a power off state, which can have the effect of making the battery 62 last longer.

The device 10 also includes main oscillator circuitry 78. The main oscillator circuitry 78 is provided for generating a relatively high frequency clock signal as compared to the clock signal generated by the oscillator 74. The main oscillator circuitry 78 operates when the device 10 is in the power on state, and the clock signal it generates is received by the microprocessor 38 and other components of the device 10 requiring the clock signal. In some examples of the device 10, the main oscillator circuitry 78 will generate a clock signal well over 1 MHz in frequency in order to meet the high processing requirements of the device 10.

In at least one embodiment, the software resident on the device 10 includes an alarm application 59. The alarm application 59 allows the user to set an alarm time and date. At the selected time and date, the device 10 will emit an alarm signal. The alarm signal may be any sensible signal for alerting the user. Typically, the alarm signal is an auditory signal; however, it in some embodiments the alarm signal may be a kinetic signal, such as a vibration. In some embodiments, the alarm signal may be a combination of an auditory and kinetic signal. Other variations will be apparent to those of ordinary skill in the art.

Although the alarm application 59 is shown as a stand-alone application in the example embodiment shown in FIG. 1, it will be appreciated that the alarm application 59 may be implemented as a module or component of another application program or it may be implemented as a module or component of the operating system 54. Any references herein to the "alarm application" are intended to include applications, modules, subroutines, and any other software-based implementations that may be used to give effect to the functions described herein. The suitable programming of such software-based modules will be understood by those of ordinary skill in the art having regard to the description herein.

The alarm application 59 receives user input regarding the time and date at which the user desires an alarm signal. The alarm application 59 may provide a user interface through which the user may select the alarm time and date. The alarm application 59 may then store the alarm time and date in memory, such as, for example, flash memory 24 or RAM 26.

The alarm application 59 monitors the current time and date and causes an alarm signal to be emitted at the selected alarm time and date. As noted above, the alarm application 59 may not emit the alarm signal at the correct time and date if the device 10 is off or in a sleep mode when the correct time and date occur. Due to the time delay inherent in booting the device 10, even if the device 10 is powered up when the alarm time and date are reached the alarm application 59 may not be able to cause the alarm signal to be emitted until several minutes after the selected alarm time and date. Accordingly, the alarm application 59 adjusts the selected alarm time and date to take into account the time delay associated with booting the device 10 when starting from a power-down or sleep mode.

The alarm application 59 determines the adjusted alarm time and date by subtracting a predicted boot time from the user-selected alarm time and date. The adjusted alarm time and date are then stored in memory. In some embodiments the adjusted alarm time and date may be stored in flash memory 24. In some embodiments the adjusted alarm time and date may be stored in a memory associated with, or contained within, the system timer component 70. The system timer component 70 is configured to react to the occurrence of the adjusted time and date by starting or booting the device 10. In other words, the system timer component 70 monitors the current time and date and compares it to the stored adjusted time and date. When the current time and date registers with the adjusted time and date, the system timer component 70 issues an interrupt on interrupt line 68 in order to trigger booting of the device 10.

In this manner, the boot process is initiated at a time sufficiently prior to the actual selected alarm time so as to ensure that the device 10 is fully operational when the alarm time arrives, and therefore the alarm application 59 may cause emission of the alarm signal at the correct time.

Figure 2:
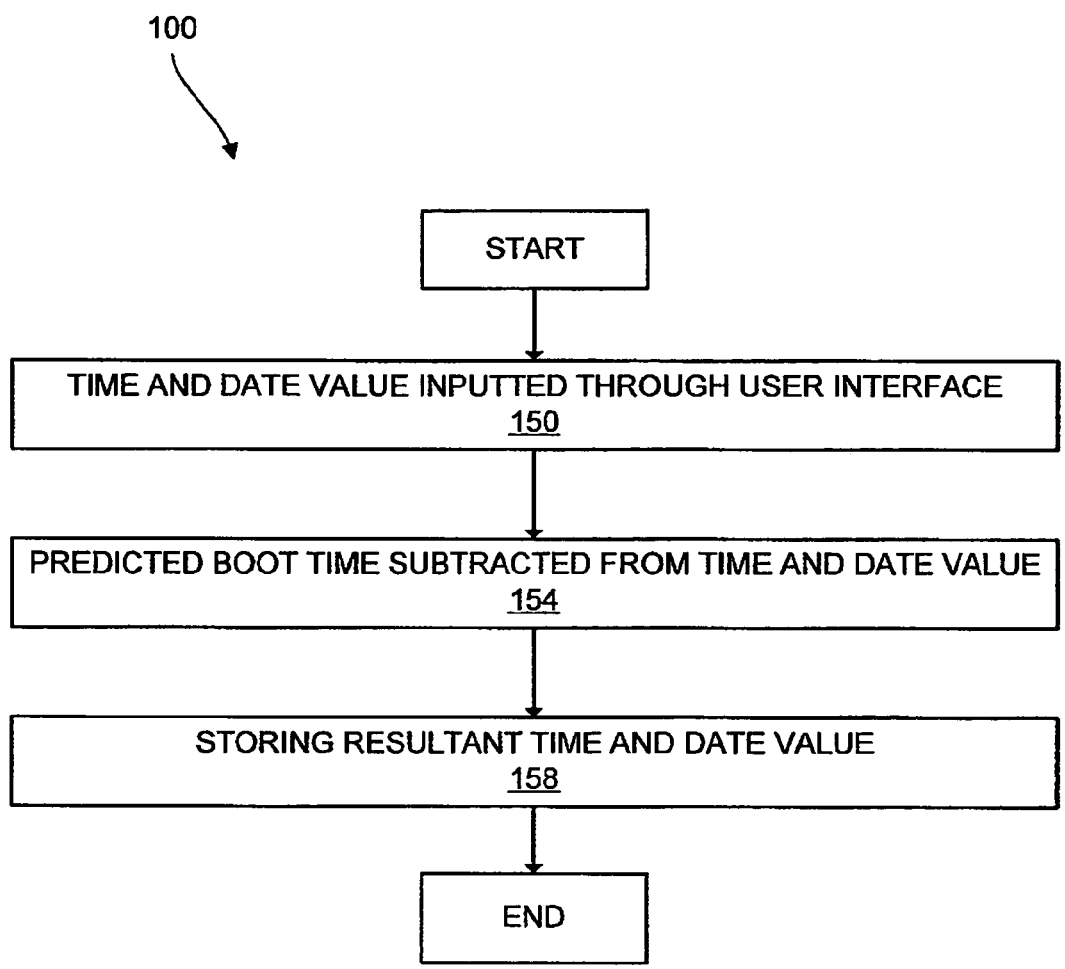
FIG. 2 shows, in flow chart form, an alarm time and date calculation method, carried out by an alarm module, in accordance with example embodiments of the invention.

FIG. 2 illustrates an alarm time and date calculation method 100 carried out by the alarm application 59. The method 100 begins at start step 150 where the user of the device 10 inputs the time and date at which he would like the alarm to be generated. The user would normally do this by interaction through a device generated user interface responsive to one or more input devices (for example a mini-keyboard, a keypad of a cellular telephone, etc.) of the device 10. The user interface may accept text input and/or provide a menu of times/dates for selection.

In step 154, the alarm application 59 determines the adjusted time and date value. In particular, the alarm application 59 subtracts a predicted boot time for the device 10 from the user-selected time and date value that was input in step 150. In some examples, the predicted boot time may be a constant value written to the flash memory 24, for instance, at the time of manufacture. In such examples, the constant value selected may be the duration of time for which it would be reasonable to expect that the device 10 might boot. This expected duration would, of course, vary amongst different mobile communication devices. For instance, in some example devices, booting might reasonably be expected to complete in 1 minute, and in other example devices booting might reasonably be expected to complete in 5 minutes. Alternatively, the constant value selected may be the duration of time for a worse case boot assuming that the device will be functioning normally. In other examples, the predicted boot time may be based on previously measured boot times. For instance, the predicted boot time may be based on an average of a number of last previously measured boot times. The alarm application 59 or another module or component may track the length of time that it takes for the device 10 to complete a boot from a sleep or off state. It will be understood that boot times for the illustrated device 10 may be measured by subtracting the time value of the system timer component 70 when booting of the device 10 ends from the time value of the system timer component 70 when booting of the device 10 begins. The measured boot times may be used to determine the predicted boot time value through averaging, weighted averaging, etc., and a buffer time may be added to ensure the predicted boot time is sufficiently long to ensure the boot process is complete when the alarm time occurs.

As will be appreciated by those skilled in the art, a distinction is sometimes made between a cold boot (or power on boot) where memory cells in RAM have not been maintained, and a warm boot (or resumed boot) where memory cells in RAM have been maintained. In the context of some embodiments, boot time may refer to cold boot time. Usually a warm boot does not create significant delay issues in relation to generation of alarm signals; however, in some embodiments, the method 100 may relate to a warm boot. In some embodiments, the device 10 may include a predicted boot time specific to a cold boot and a different shorter predicted boot time specific to a warm boot. The device 10 may store one adjusted time/date for cold boot purposes and a different adjusted time/date for warm boot purposes.

Step 158 is the final step of the method 100. At step 158 the adjusted time and date determined in step 154 is stored in a non-volatile storage such as, for example, the flash memory 24 or a register set within the system timer component 70. This stored adjusted time and date value is accessed by the system timer component 70 when the device 10 is in a power-down or off state to determined whether it is time to deliver an interrupt on the interrupt line 68 in order for the device 10 to be booted.

Figure 3:
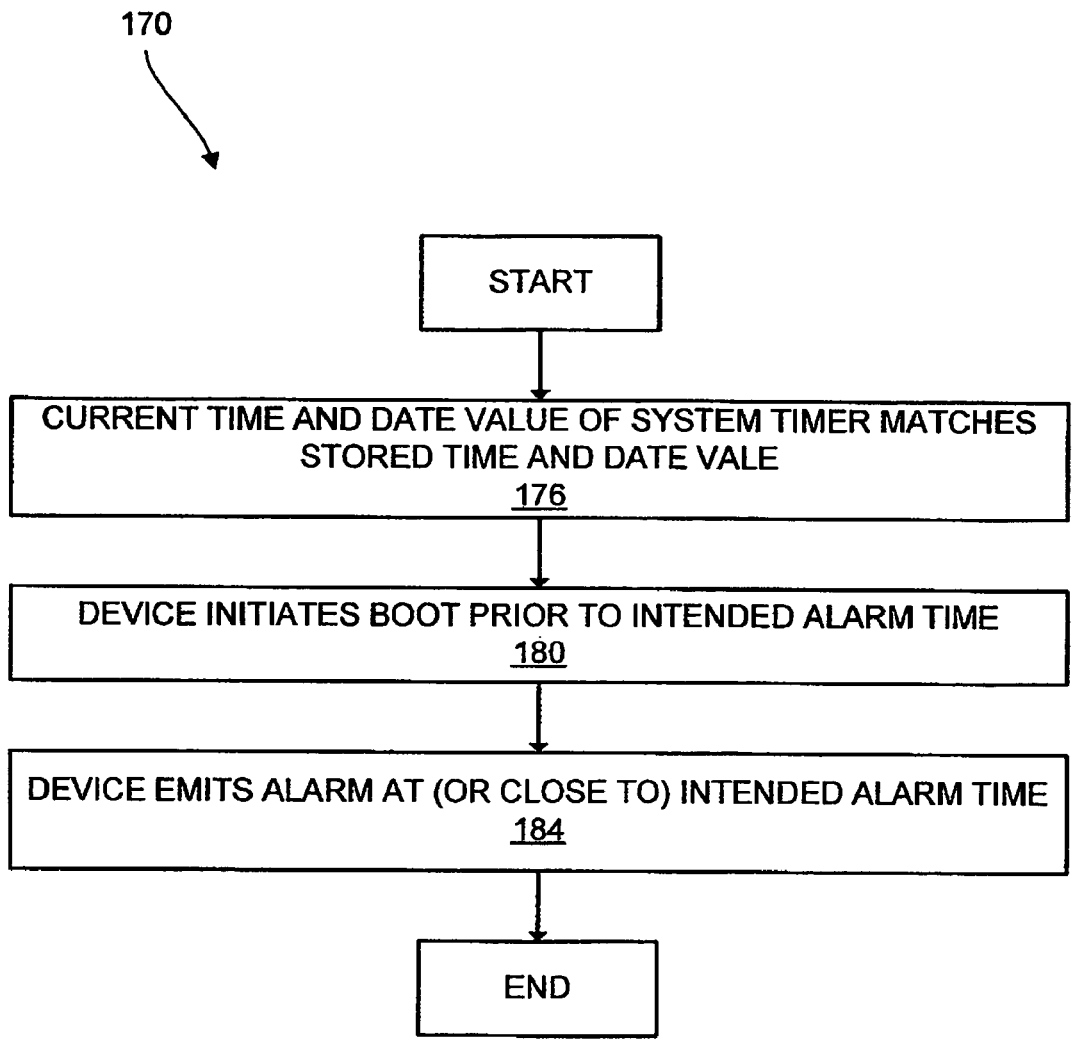
FIG. 3 shows, in flow chart form, steps carried out by the device of FIG. 1 to generate an alarm in accordance with example embodiments of the invention.

Reference is now made to FIG. 3, which shows a method 170 for generating an alarm signal. The first step is step 176 where the system timer component 70 registers that the current time and date value matches the stored adjusted time and date value. In other words, it is now time for the device 10 to be booted.

In step 180 the device 10 begins a cold boot. As previously discussed, the boot can be initiated when the system timer component 70 delivers an interrupt on the interrupt line 68. Ideally, the boot is initiated early enough so that the process is substantially complete at least a number of seconds before the intended alarm time (the intended alarm time being the time and date value inputted by the user at the time of the step 150 of the method illustrated in FIG. 2).

In some examples of the device 10, although the device 10 is booted in anticipation of the alarm, the communications subsystem 11 is optionally kept powered down by the power control unit 61 and/or the short range communications subsystem 40 is optionally kept powered down by the power control unit 63. These subsystems may be powered at a later time when needed by the user of the device 10.

Step 184 is the final illustrated step. At this step the device 10 emits an alarm signal at the intended alarm time. The alarm is not missed or significantly delayed because sufficient lead time was provided for the device 10 to complete its boot prior to occurrence of the alarm time.

Certain adaptations and modifications of the described embodiments can be made. Therefore, the above discussed embodiments are considered to be illustrative and not restrictive.

What is claimed is:

1. A mobile communications device that is operated by a device user, the device comprising:
   an alarm indicator for notifying the user of an alarm condition;
   an alarm application for receiving an input alarm time and subtracting a predicted boot time from said input alarm time to generate an adjusted alarm time; and
   a system timer component for monitoring a current time and outputting an interrupt signal to trigger a boot process when said current time matches said adjusted alarm time,
   whereby said alarm application includes a component for triggering operation of said alarm indicator when said input alarm time occurs.

2. The communications device as claimed in claim 1, wherein said device includes a power on state and a power off state, and wherein said system timer component outputs said interrupt signal if said device is in said power off state and not if said device is in said power on state.

3. The communications device as claimed in claim 2, wherein said device further includes a power sleep state, and wherein said system timer component outputs said interrupt signal if said device is in said power sleep state.

4. The communications device as claimed in claim 1, wherein said predicted boot time includes a warm boot time and a cold boot time, said cold boot time being longer than said warm boot time, and wherein said alarm application includes a component for subtracting said warm boot time from said input alarm time to generate a warm boot alarm time, and a component for subtracting said cold boot time from said input alarm time to generate a cold boot alarm time.

5. The communications device as claimed in claim 4, further including a microprocessor having a power on state, a power off state, and a power low state, and wherein said system timer component includes a component for determining the state of the microprocessor, and wherein said system timer component outputs said interrupt signal at said warm boot alarm time if said state comprises said power low state, and wherein said system time component outputs said interrupt signal at said cold boot alarm time if said state comprises said power off state.

6. The communications device as claimed in claim 1, wherein said system timer component includes a memory, and wherein said alarm application stores said adjusted alarm time in said memory.

7. The communications device as claimed in claim 1, wherein said alarm indicator comprises a speaker or a vibrator.

8. The communications device as claimed in claim 1, wherein said predicted boot time comprises an anticipated time for completion of said boot process plus a buffer time.

9. A method of using a mobile communications device to emit an alarm signal to a device user, the method comprising steps of:
   receiving an input alarm time;
   subtracting a predicted boot time from the input alarm time to generate an adjusted alarm time;
   storing said adjusted alarm time;
   while the device is in a low-power or off state, monitoring a current time and outputting an interrupt signal to trigger a boot process when said current time matches said adjusted alarm time
   emitting the alarm signal at said input alarm time, whereby said boot process is completed prior to said input alarm time.

10. The method as claimed in claim 9, wherein said device includes a power on state and a power off state, and wherein said steps of monitoring and outputting are performed when said device is in said power off state, but not when said device is in said power on state.

11. The method as claimed in claim 10, wherein said device further includes a power sleep state, and wherein said steps of monitoring and outputting are performed if said device is in said power sleep state.

12. The method as claimed in claim 9, wherein said predicted boot time comprises a warm boot time and a cold boot time, said cold boot time being longer than said warm boot time, and wherein said step of subtracting includes subtracting said warm boot time from said input alarm time to generate a warm boot alarm time and subtracting said cold boot time from said input alarm time to generate a cold boot alarm time.

13. The method as claimed in claim 12, wherein said device includes a power on state, a power off state, and a power low state, and wherein said step of outputting said interrupt signal occurs at said warm boot alarm time if said state comprises said power low state, and wherein said step of outputting said interrupt signal occurs at said cold boot alarm time if said state comprises said power off state.

14. The method as claimed in claim 9, wherein said alarm indicator comprises a speaker or a vibrator.

15. The method as claimed in claim 9, wherein said predicted boot time comprises an anticipated time for completion of said boot process plus a buffer time.

16. A mobile communications device that is operated by a device user, the device comprising:
   means for receiving an input alarm time and subtracting a predicted boot time from said input alarm time to generate an adjusted alarm time;
   means for monitoring a current time and outputting an interrupt signal to trigger a boot process when said current time matches said adjusted alarm time; and
   means for emitting an alarm to notify the user of an alarm condition when said input alarm time occurs following completion of said boot process.

17. The communications device as claimed in claim 16, wherein said predicted boot time includes a warm boot time and a cold boot time, said cold boot time being longer than said warm boot time, and wherein said means for subtracting includes means for subtracting said warm boot time from said input alarm time to generate a warm boot alarm time and means for subtracting said cold boot time from said input alarm time to generate a cold boot alarm time.

18. The communications device as claimed in claim 17, wherein said device includes a power on state, a power off state, and a power low state, and further including means for determining the state of the device, and wherein means for outputting said interrupt signal includes means for outputting said interrupt signal at said warm boot alarm time if said state comprises said power low state, and means for outputting said interrupt signal at said cold boot alarm time if said state comprises said power off state.

19. The communications device as claimed in claim 16, wherein said predicted boot time comprises an anticipated time for completion of said boot process plus a buffer time.

* * * * *